(12) United States Patent
Miao et al.

(10) Patent No.: US 8,503,530 B2
(45) Date of Patent: Aug. 6, 2013

(54) TEMPORAL CLASSIFIED FILTERING FOR VIDEO COMPRESSION

(76) Inventors: Zhourong Miao, Sunnyvale, CA (US); James J. Carrig, Jr., San Jose, CA (US); Marco Paniconi, Campbell, CA (US)

( * ) Notice: Subject to any disclaimer, the term of this patent is extended or adjusted under 35 U.S.C. 154(b) by 2057 days.

(21) Appl. No.: 10/856,093

(22) Filed: May 27, 2004

(65) Prior Publication Data

US 2005/0265452 A1 Dec. 1, 2005

(51) Int. Cl.
*G06K 9/40* (2006.01)
(52) U.S. Cl.
USPC .................. 375/240.16; 382/232; 382/236
(58) Field of Classification Search
USPC ..................................... 375/240.16
See application file for complete search history.

(56) References Cited

U.S. PATENT DOCUMENTS

| | | | | |
|---|---|---|---|---|
| 5,557,684 A * | 9/1996 | Wang et al. | .................. | 382/107 |
| 5,838,823 A * | 11/1998 | Ancessi | ..................... | 382/232 |
| 5,995,668 A * | 11/1999 | Corset et al. | .................. | 382/233 |
| 6,212,235 B1 * | 4/2001 | Nieweglowski et al. | | 375/240.08 |
| 6,249,548 B1 * | 6/2001 | Kleihorst et al. | ........ | 375/240.17 |
| 6,351,494 B1 * | 2/2002 | Kondo et al. | ............ | 375/240.27 |
| 6,646,578 B1 * | 11/2003 | Au | ................................. | 341/67 |
| 7,349,473 B2 * | 3/2008 | Hallapuro et al. | ........ | 375/240.12 |
| 2003/0169931 A1 * | 9/2003 | Lainema | ...................... | 382/236 |

* cited by examiner

*Primary Examiner* — Christopher S Kelley
*Assistant Examiner* — Mohammed Jebari
(74) *Attorney, Agent, or Firm* — Blakely, Sokoloff, Taylor & Zafman LLP

(57) ABSTRACT

Temporal classified filtering encodes image data by applying filters assigned to classes of pixels in a target frame to predict values for the pixels. The pixels are classified based on their associated motion vectors and the motion vectors are used to position the filters on the reference frame. Prediction error values are also calculated. The filters, motion vectors, and prediction errors represent the pixels in the encoded image data. The reference frame may be a past or future frame of the image data, and multiple reference frames of various combinations of past and future frames may be used. The filters for multiple reference frames are three-dimensional comprising a two-dimensional filter for each reference frame. The filters may be pre-determined or generated as the frames are encoded. The image data is recreated by applying the filters to the reference frames and correcting the resulting predictions with the prediction error values.

45 Claims, 11 Drawing Sheets

× Pixels in the frame.

○ Filter taps.

(i, j) : filter position, represented in pixel coordiniates

○ Filter taps

● Target pixel (i,j) in the current frame, belongs to segment with class ID = c

● The reference pixel (i',j') for the target pixel (i,j)

mv : Motion vector for the target pixel (i,j), mv=(i'–j, j'–j)

Wc : The classified filter for class c

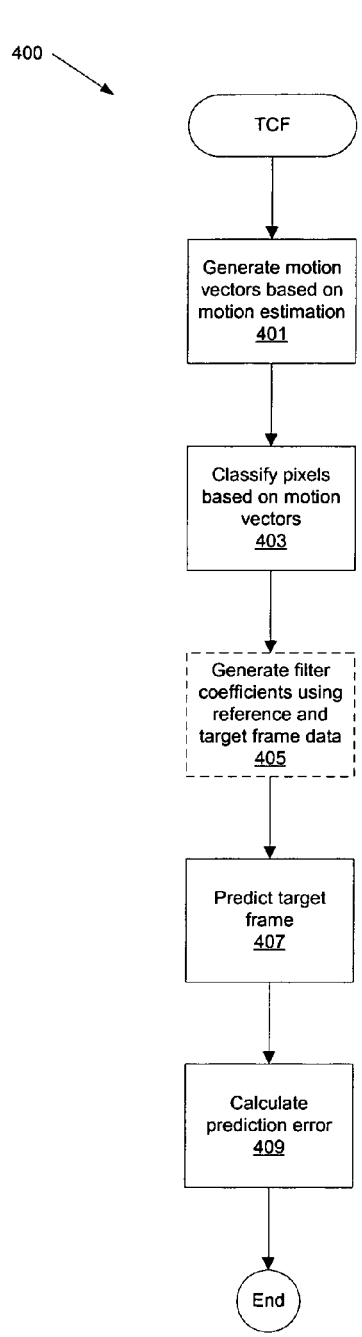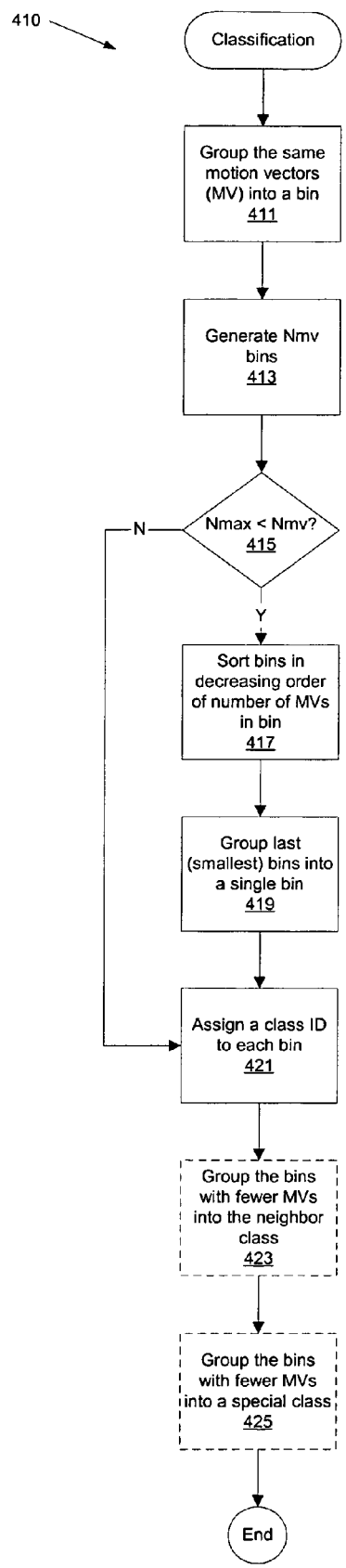
Figure 4A
Figure 4B

TEMPORAL CLASSIFIED FILTERING FOR VIDEO COMPRESSION

FIELD OF THE INVENTION

This invention relates generally to video compression, and more particularly to compression based on predicting frames of image data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2003, Sony Electronics Inc., All Rights Reserved.

BACKGROUND OF THE INVENTION

High compression gain for video sequences can be achieved by removing the temporal redundancy across frames. To encode a current frame, the frame is first predicted based on a previously coded "reference" frame, and only the prediction error is encoded. Block-based motion estimation and compensation has been a popular method for temporal prediction, and is widely used. As illustrated in FIG. 1, its basic idea is to find a similar counterpart block in the reference frame 101 to predict a target block in the current frame 103, and therefore only the prediction residual of the target block needs to be coded.

Traditional methods to achieve accurate temporal prediction is to use sub-pixel motion search, which leads to large amount of motion vector overhead. In addition, it can not provide arbitrary sub-pixel resolution, but instead only pre-determined sub-pixel resolutions, e.g. ½, ¼, or ⅛, can be obtained. However, in reality, the object in the picture may have a movement at an arbitrary sub-pixel resolution, which cannot be estimated from the traditional pure motion compensation method. To achieve fine motion resolution with pure motion compensation, it costs more bits to represent each motion vectors which will lead to poor compression performance.

SUMMARY OF THE INVENTION

Temporal classified filtering encodes image data by applying filters assigned to classes of pixels in a target frame to predict values for the pixels. The pixels are classified based on their associated motion vectors and the motion vectors are used to position the filters on the reference frame. Prediction error values are also calculated. The filters, motion vectors, and prediction errors represent the pixels in the encoded image data. The reference frame may be a past or future frame of the image data, and multiple reference frames of various combinations of past and future frames may be used in the prediction. The filters for multiple reference frame prediction are three-dimensional filters comprising a two-dimensional filter for each reference frame. The filters may be pre-determined or generated as the frames are encoded. The image data is recreated by applying the filters to the reference frames and correcting the resulting predictions with the prediction error values.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

FIGS. 4A-D are flow diagrams of methods of the temporal classified filtering to be performed by a computer according to various embodiments;

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 2:
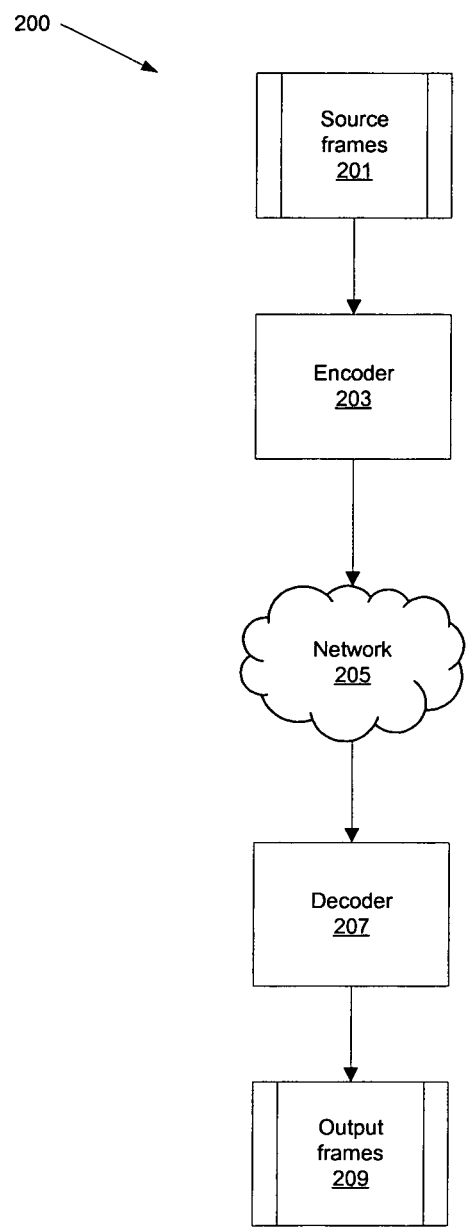
FIG. 2 is diagram illustrating a system-level overview of data encoding and using an embodiment of temporal classified filtering.

FIG. 2 illustrates a encoding and decoding system 200 that encodes source frames of image data 201 using temporal classified filtering (TCF) together with conventional motion compensation to achieve more compression gain and better visual results. Encoder 203 uses block-based motion estimation to find motion vectors for each block in the frame to be encoded (target frame). The pixels in the target frame are grouped into different classes based on their motion properties so the frame is essentially segmented using motion vectors. A designated filter is assigned to all the pixels in a class. To predict a target pixel, the corresponding filter is placed on one or more previously encoded frames (reference frames), positioned by the motion vector of the target pixel. The temporal prediction of the target pixel is obtained by the filtering operation on other pixels in the reference frame(s). The encoder 203 also calculates a prediction error for the target pixel, i.e., the difference between the actual pixel value and the predicted value. The encoded frames, the motion vectors, and prediction errors are subsequently encoded for transmission through a communication link, illustrated as network 205, to decoder 207. The filter coefficients may also be transmitted or recreated by decoder 207. The particular transmission encoding is not germane to the operation of TCF and any common encoding technique may be employed. Decoder 207 predicts the values of the target pixels using the filters and motion vectors, and applies the prediction errors to the predicted values to create output frames of image data 209. Thus, TCF requires only coarse, i.e., pixel-wise resolution, motion vectors, and provides arbitrary sub-pixel resolution in temporal prediction. Therefore the pixel prediction error will be small and high compression gain can be achieved. In addition, the use of pixel data in multiple reference frames to predict the target pixel provides more prediction precision.

Figure 3A:
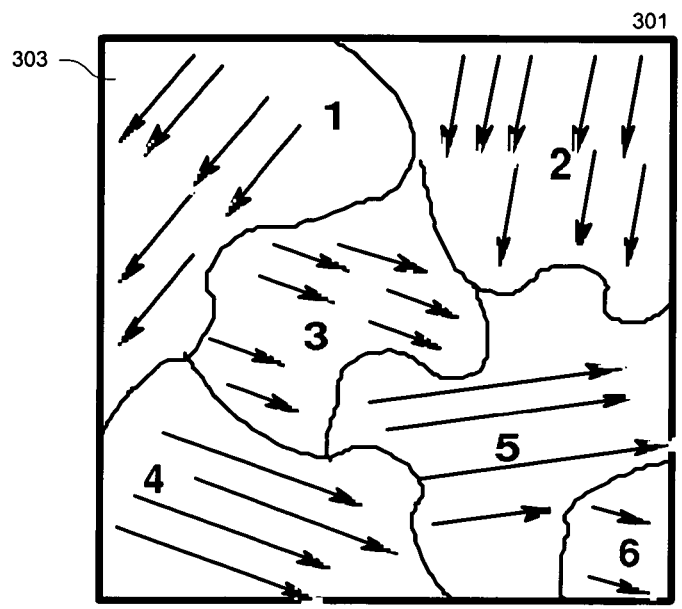
FIGS. 3A-C are diagrams of embodiments of the temporal classified filtering using a single reference frame.
Figure 3B:
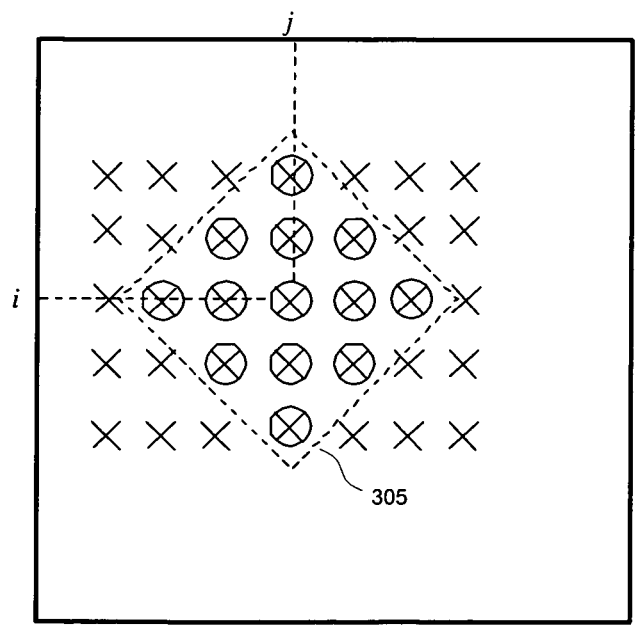
Figure 3C:
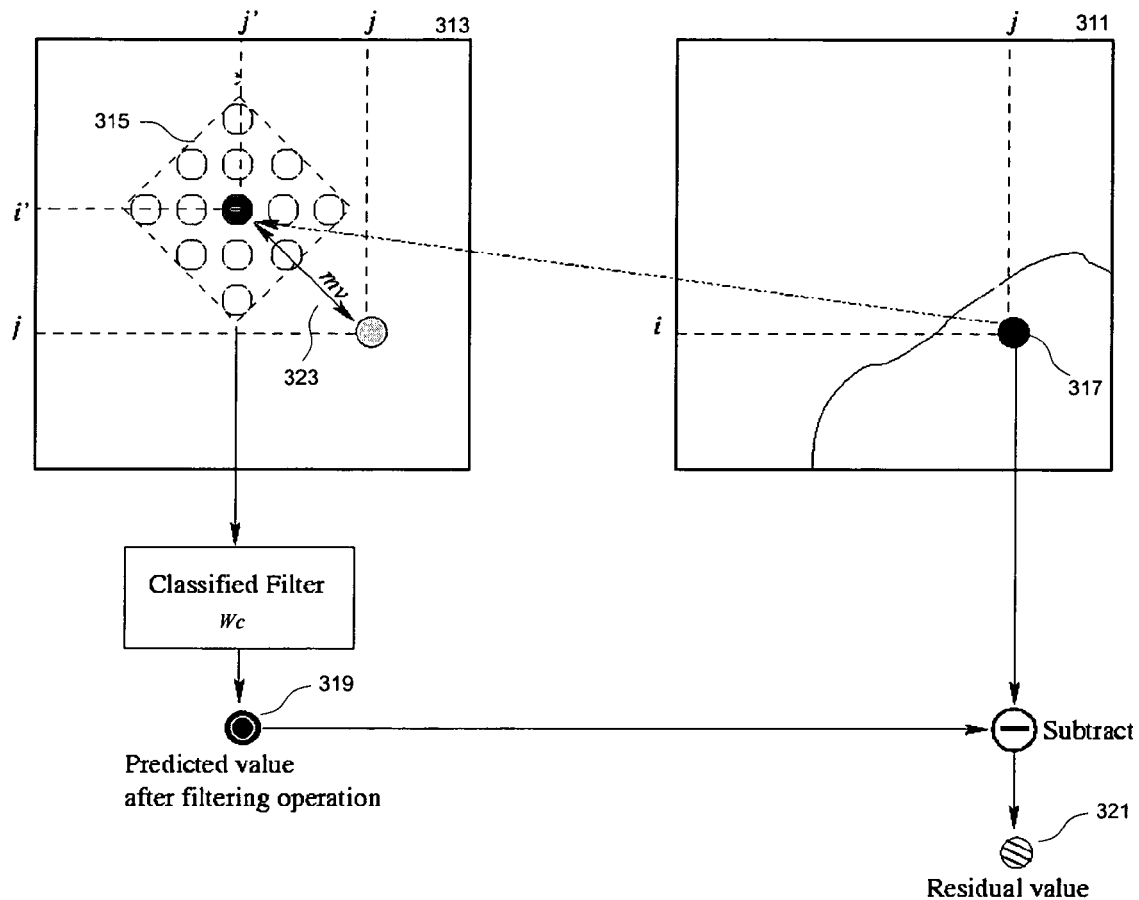

FIGS. 3A-C illustrate the use of TCF to encode a target frame in one embodiment. FIGS. 3A-C assume a single reference frame, past or future, is used. Embodiments that use multiple reference frames are described further below.

FIG. 3A illustrates a target frame 301 in which the pixels have been classified into six segments, e.g., segment 303, based on the motion vectors of the pixels (illustrated as arrows). In general, pixels with similar motion vectors will be grouped together into the same segment. After the motion vectors have been obtained using well-known block matching motion estimation techniques, the motion vectors are classified and a class ID is assigned to each motion vectors. The pixels that correspond to the motion vector are also assigned with that class ID. After classification, a segment can contain pixels which are either connected or disconnected to each other.

For example, referring back to FIG. 1, let t be the index of the frames in time order (temporal domain). Suppose a pixel p(i,j,t) in the target frame $F_t$ 103 has motion vector $[m_i, m_j]$ 105 that refers to the reference frame $F_{t_r}$ 101 (the frame at time $t_r$). Then the traditional motion compensation based temporal prediction can be viewed as $$\hat{v}_{mc}(i,j,t) = v(i',j',t_r) \quad (1)$$

where $v(i',j',t_r)$ is the value of the pixel at column i' row j' in previous frame $F_{t_r}$. The position of this reference pixel is located by the motion vector $[m_i, m_j]$. In this case, $m_i = i'-i$ and $m_j = j'-j$.

All the pixels in the target frame are classified into $N_c$ class or segments, where $N_c$ is a positive integer. A unique filter is associated with each class or segment c, and thus there are $N_c$ filters for each target frame. These filters are referred as classified filters. The coefficients for the filters may be pre-defined or may be created by training or other techniques as described further below. Each filter is an arbitrary two-dimensional shape, e.g., rectangular, circle, diamond, etc., defined by a set of pixel positions or filter taps. A diamond shaped filter 305 is illustrated in FIG. 3B. Note that each classified filter may have different shape and different coefficients.

As illustrated in FIG. 3C, for each pixel p(i, j) in a target frame $F_t$ 311 the value of the pixel v(i, j, t) 317 can be estimated from a group of pixels in a reference frame $F_{t_r}$ 313 by applying the filter $W_c$ 315 corresponding to the class ID c of the pixel. Each filter tap will align to a pixel in the reference frame, and all the pixels that are covered by the filter taps form a region R. The pixel value v can be expressed as its predicted value $\hat{v}$ 319 plus a residual values used as prediction error $\epsilon$ 321:

$$v(i,j,t) = \hat{v}(i,j,t) + \epsilon(i,j,t) \quad (2)$$

where $$\hat{v}(i,j,t) = W_c(R) \quad (3)$$

The position of the filter in the reference frame can be expressed in pixel coordinates. Alternatively, one tap in the filter may be selected as an "anchor tap", in which case, the filter position is defined as the coordinate of the pixel in the frame that the filter anchor tap aligns on. The motion vector $[m_i, m_j]$ 323 of the target pixel is used to locate the reference position (i', j'):

$$i' = i + m_i \text{ and } j' = j + m_j. \quad (4)$$

When an anchor tap is used, the filter $W_c$ is placed on the reference frame $F_{t_r}$ with its anchor tap matching the reference pixel position. Once the filter taps (in other words, the filter shape) and the filter position are provided, the region of input tap pixels is also uniquely defined.

Let all the values of the input tap pixels and the filter coefficients form vectors X and W, respectively. Each vector has n elements, where n is the number of filter taps, i.e. $X = [x_1, x_2, \ldots x_n]$ and $W = [w_1, W_2, \ldots w_n]$. The elements in two vectors should follow the same order, i.e., element $x_i$ is the input tap that aligns to the filter tap $w_i$ in the spatial domain. Accordingly, the filtering operation of equation 2 can be expressed as the following vector product:

$$\hat{v} = W_c(R) \stackrel{\Delta}{=} W \cdot X^T = \sum_{i=1}^{n} w_i \cdot x_i \quad (5)$$

The predicted value is used to represent the pixel in the encoded frame. The prediction error is also produced using $$\epsilon = v - \hat{v} \quad (6)$$

and transmitted to the decoder to correct the prediction when decoding the frame.

For the sake of clarity, FIGS. 3A-C illustrate the operation of an embodiment of temporal classified filtering using a single reference frame but the invention is not so limited. TCF pixel prediction using multiple reference frames can be easily extended from the single frame embodiment as described further below.

One embodiment of a temporal classified filtering method 400 to be performed by as encoder, such as encoder 203 of FIG. 2, is described with reference to diagrams shown in FIGS. 4A-D.

Turning first to FIG. 4A, input to the TCF method 400 is the target, or current, frame and a (pre-coded) single reference frame. It will be appreciated that the TCF method 400 is not restricted to use with only a single reference frames, and application of the TCF method using multiple frames is discussed further below in conjunction with FIGS. 5A-D.

At block 401, the TCF method finds the motion vectors for all pixels in the target frame based on the reference frame. This is similar to the standard video compression (e.g., MPEG). As described above, the target frame is divided into fixed size blocks and block matching is performed to find the motion vectors for each block. All the pixels in the same block share the same motion vector. The motion vector can have either pixel or sub-pixel resolutions.

At block 403, the pixels in the target frame are classified into several segments based on the motion vectors of the pixels as described above in conjunction with FIG. 3A. In general, the pixels with similar motion vectors will be grouped together into the same segment. After classification, a segment can contain pixels which are either connected or disconnected to each other. Each pixel is assigned a class ID c based on the classification of its motion vector.

A unique filter $W_c$ is assigned for each class c of the pixels. The filter taps and shape of the filter can be pre-defined. The number of classes (or segments) $N_c$ in the frame can be either a pre-determined value or be determined based on the characteristic of the frame. For example, FIG. 3A illustrates a frame where $N_c=6$. The classification at block 403 can viewed as a general two-dimensional segmentation problem with $N_c$ centroids, where the elements to be classified are the motion vectors of the target frame. In one embodiment, the traditional k-means segmentation method, i.e., where $k=N_c$ is used. In an alternate embodiment, as illustrated in FIG. 4B, the pixel can be classified quickly and with low complexity in comparison to the k-means segmentation based on pre-determined maximum number of classes $N_{max}$, as described further below.

As discussed above, each filter may have different shape (filter taps) and different coefficients. The coefficients may be pre-defined or optionally, as represented by phantom block 405, generated when needed using a variety of ways. For example, the coefficients may be the weights corresponding to the temporal distance between input taps and reference position (i', j') (or filter position). Filter coefficients can also be generated by on-line self training with the data from reference and target frames as described below in conjunction with FIG. 4C.

For the target pixel with class ID c, the TCF method 400 predicts the value of the pixel using the associated classified filter $W_c$ (block 407) as described above in conjunction with FIG. 3C.

The prediction error is calculated at block 409. As discussed above, the prediction error and the motion vectors are sent to the decoder. The class IDs and filter coefficients may also have to be transmitted to the decoder if the class IDs cannot that be derived from the motion vectors and if the filter coefficients have been generated at block 405.

FIG. 4B illustrates a classification method 410 that takes the motion vectors of the target frame and outputs is the class IDs for each pixel. At block 411, the classification method 410 groups motion vectors that have the same values into a bin. At block $N_{mv}$ bins are generation with each bill b containing $n_b$ number of the same motion vectors. In this embodiment, two motion vectors, $mv_1=[m_{i1}, m_{j1}]$ and $mv_2=[m_{i2}, m_{j2}]$, are defined to be same, i.e., $mv_1=mv_2$ if and only if $m_{i1}=m_{i2}$ and $m_{j1}=m_{j2}$.x If $N_{max} \geq N_{mv}$ (block 415), the number of bins are less than the $N_{max}$, and so the method 410 proceeds to bock 421.

On the other hand, if $N_{max} < N_{mv}$ (block 415), some of the bins will have to be combined to reduce the number of bins to $N_{max}$. The bins are sorted in decreasing order of $n_b$ (the number of motion vectors in a bin) at block 417. Thus, the first bin will have the maximum number of motion vectors. Each bin in the first $N_{max}-1$ number of bins will form a class, while the remaining bins from $N_{max}$ to $N_{mv}$ are grouped together to form a single class (block 419), resulting in a total of $N_{max}$ bins. At block 421, each bin is assigned a class ID c, which may be for example, an integer.

Because all pixels in a class share the same filter, when the filter coefficients are transmitted to the decoder (e.g., coefficients are obtained by on-line training), the larger the class is (e.g., containing more pixels), the more efficient the compression performance. Therefore, in order to increase compression gain, the classification method 410 may optionally eliminate classes that have very few pixels (i.e., very few number of motion vectors). A threshold $T_{mv}$ is selected and a class containing fewer number of motion vectors than the threshold will be merged into the closest neighbor class (block 423). The threshold $T_{mv}$ can be pre-determined, e.g., $T_{mv}=10$. The closes neighbor class is based on measuring a distance $d_{a,b}$ between pairs of classes. In one embodiment, the distance is the Euclidean distance between the two centroids of the classes $$d_{a,b} = (M_{a,1} - M_{b,1})^2 + (M_{a,2} - M_{b,2})^2 \qquad (7)$$

where $[M_{a,1}, M_{1,2}]$ and $[M_{b,1}, M_{b,2}]$ are the centroids of class a and b, respectively. The centroid of a class c ($[M_{c,1}, M_{c,2}]$, which is a vector of two elements) is the average value of the motion vectors in the class c defined as $$M_{c,1} = \frac{1}{n_c} \sum_{k=1}^{n_c} m_{k,i} \text{ and } M_{c,2} = \frac{1}{n_c} \sum_{k=1}^{n_c} m_{k,j} \qquad (8)$$

where $m_{k,i}$ and $m_{k,j}$ are the two elements of the $k^{th}$ motion vector in the class c; and $n_c$ is total number of motion vectors in class c. The closest neighbor class of a given class c is the class that has smallest distance to c.

Figure 1:
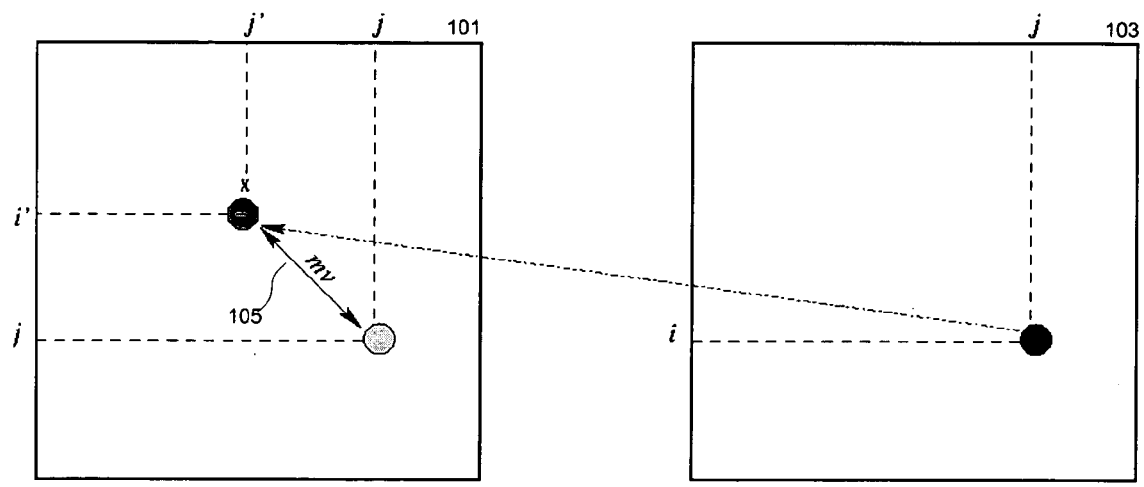
FIG. 1 is a diagram illustrating prior art block-based motion estimation and compensation.

Classes that contain very few motion vectors can be optionally grouped into a special class (block 425), instead of being merged into other neighbor classes at block 423. A very "short" filter, i.e., a filter with few taps, is assigned to this special class, to minimize the overhead of filter coefficients for this class since the cost of filter coefficients is a consideration in maximizing the overall compression gain. FIG. 1 is an example of "short" filter having only one tap, in which the target pixel is simply predicted by its reference pixel only.

Figure 4C:
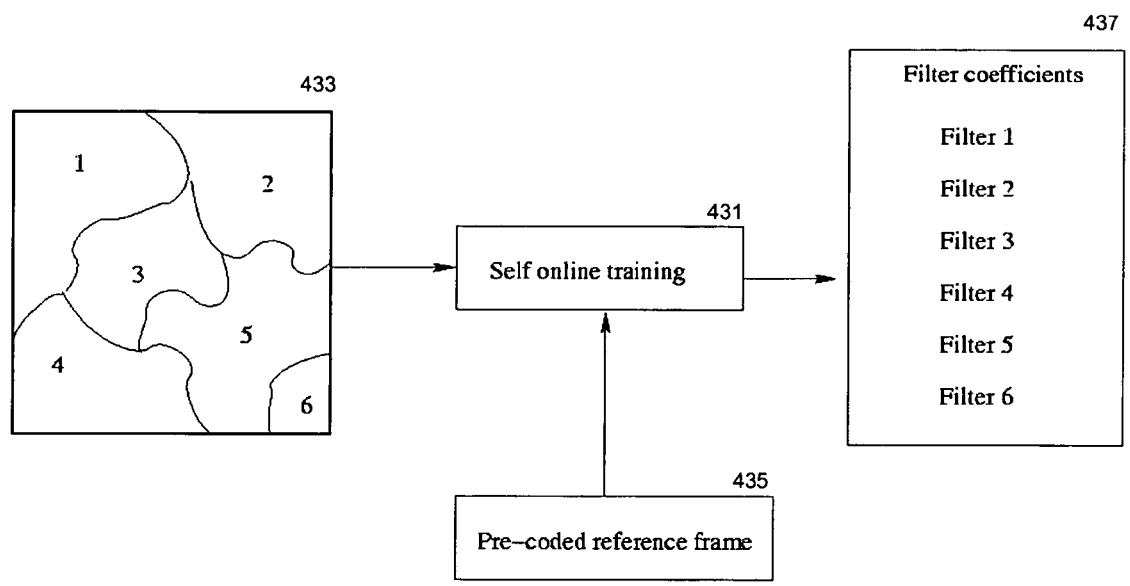

FIG. 4C illustrates the use of an on-line self training process 431 to obtain the filter coefficients. Note that there are $N_c$ number of filters, one for each classes in the target frame. As illustrated, the input to the self training process 431 is the target frame 433 containing the motion vectors for pixels and the class IDs, and the reference frame 435. The output is the filter coefficients 437 for the particular classified filter being trained. The coefficients in a filter assigned to class c is only trained by the data (pixels) that belongs to the class c.

In one embodiment, the trained filter coefficients W* are obtained according to the criteria $$W^* = \min_{w} \|X \cdot W - Y\|_2 \qquad (9)$$

where $\min_w$ is a function that minimizes the value of $\|X \cdot W - Y\|_2$ over argument W. W* is the value of W when $\|X \cdot W - Y\|_2$ reaches the minimum. Here X, Y and W are, for example, the following matrices and vectors, X is an input data vector, W is the coefficient vector and Y corresponds to the target data matrix. Examples of X, Y and W are $$X = \begin{pmatrix} x_{11} & x_{12} & \cdots & x_{1n} \\ x_{21} & x_{22} & \cdots & x_{2n} \\ \vdots & \vdots & \ddots & \vdots \\ x_{ml} & x_{m2} & \cdots & x_{mn} \end{pmatrix}, W = \begin{pmatrix} w_1 \\ w_2 \\ \vdots \\ w_n \end{pmatrix} \text{ and } Y = \begin{pmatrix} y_1 \\ y_2 \\ \vdots \\ y_n \end{pmatrix}.$$

Thus, the classified filter coefficients $w_i$ of W* obtained according to equation 9 minimize the overall prediction error for all the pixel in the same class.

Figure 4D:
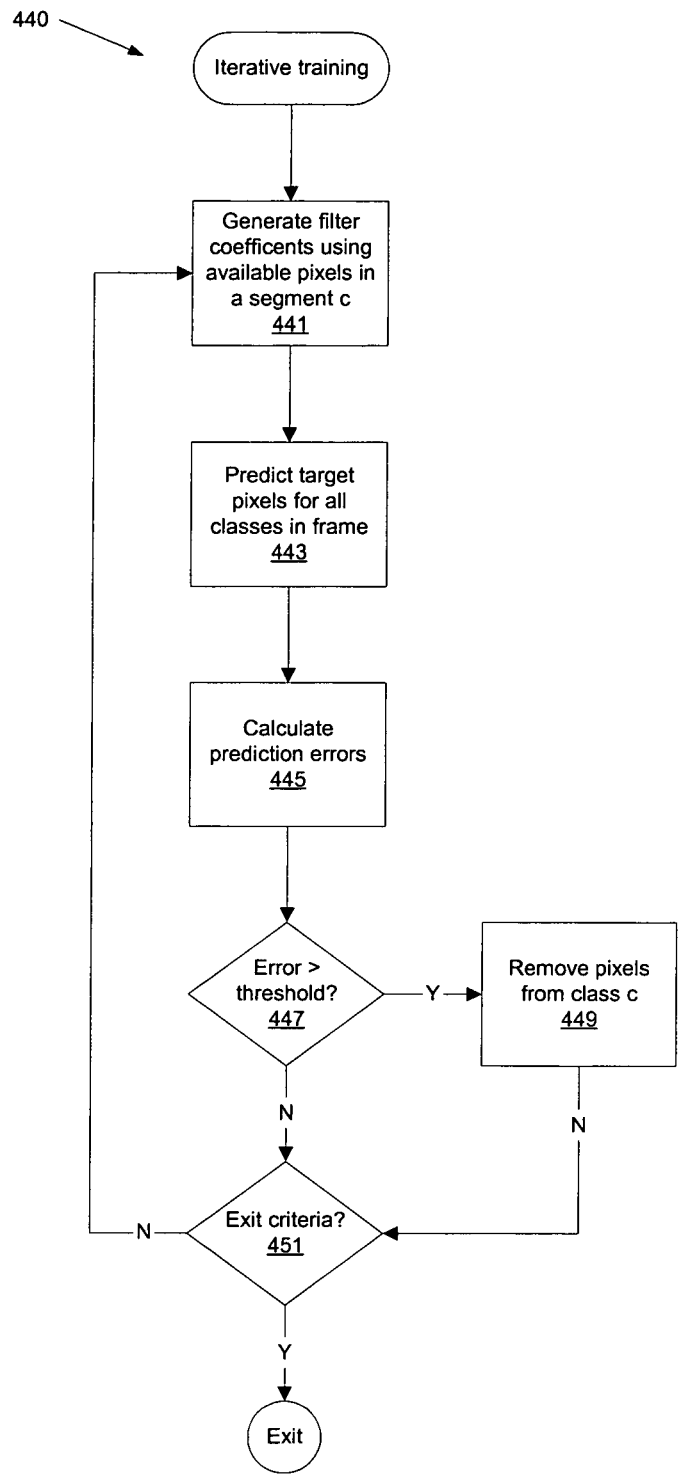

The training process can be further refined to obtain filter coefficients that provide better prediction. Since there may be "false" motion vectors that are obtained in the block matching motion compensation stage, some pixels may be assigned with motion vectors that is not accurate, e.g., they do not represent the actual movement of the object. In such a case, those pixels may ruin the training process for the filter coefficients. To avoid this, multiple iterations can be used in the training process 431 as illustrated in FIG. 4D.

At block 441, a first iteration of training method 440 uses all the pixels in the same segment c to obtain the filter coefficients for that segment class. The resulting filter coefficients are used to predict the target pixel in each class of the target frame (block 443) and the prediction error for each pixel is calculated (block 445). Pixels having a error larger than a pre-defined error threshold (block 447) are removed from the class c (block 449) so they are excluded from training in next iteration for the filter coefficients of this class. The training method 440 returns to block 441, where it operates on the remaining pixels in segment c. Training method exits when the number of iterations exceeds a pre-determined value $T_{tr}$, e.g., $T_{tr}=3$, or when the number of pixels with large prediction error is below a pre-determined number (block 451). Because the training method 440 removes pixels that are badly predicted from the training data, the filter coefficients obtained from the final iteration tend to provide a more precise prediction of the remaining pixels in the segment.

The pixels that are removed from the segment c during the iterations can be either grouped into a special class with a new filter assigned (block 425 of FIG. 4B) or remain in the same class and be predicted (block 407 of FIG. 4A) with filter coefficients obtained in the final iteration.

In practice, the method 400 may constitute one or more programs made up of machine-executable instructions. Describing the method with reference to the flow diagrams in FIGS. 4A-D enables one skilled in the art to develop such programs, including such instructions to carry out the operations (acts) represented by the logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in FIGS. 4A-D without departing from the scope of the invention and that no particular order is implied by the arrangement of blocks shown and described herein.

Figure 5A:
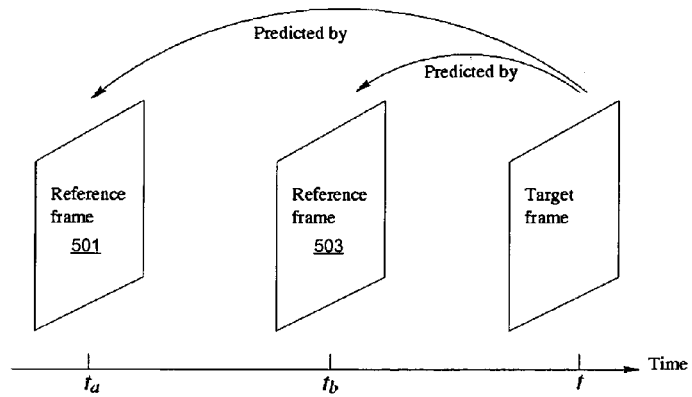
FIGS. 5A-D are diagrams of embodiments of the temporal classified filtering using multiple reference frames.
Figure 5B:
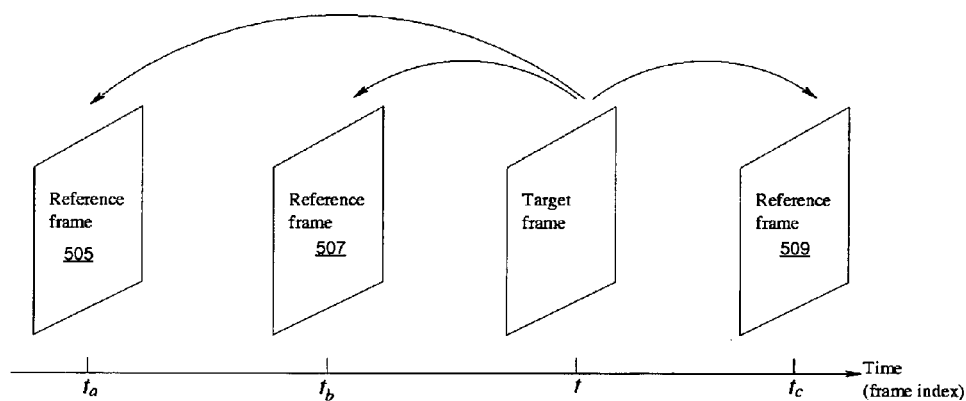

A particular implementation of the TCF that uses multiple reference frames is now described with reference to FIGS. 5A-D. The embodiments of the TCF previously described have predicted pixels based on a single reference frame. This can be easily extended to the case with multiple reference frames. For some target frame, it is possible to be predicted base on several reference frames, which can be either past or future frames, or any combination of them, by indexing the reference frames. FIGS. 5A and 5B illustrates the prediction of a target frame from multiple past reference frames 501, 503 and past 505, 507 and future 509 reference frames.

Assuming $N_r$ reference frames, each block (or pixel) will have $N_r$ motion vectors associated with each reference frame. The motion vector would be constructed as $[m_i, m_j, m_t]$, where $m_t$ is a new element representing an index for each reference frame. Since there are $N_r$ motion vectors for each target pixel, the classification procedure differs slightly from the above case with single reference frame, i.e., $N_r=1$. For each block of pixels, motion vector is selected from all the available $N_r$ motion vectors. In one embodiment, the selection is based on which motion vector leads to the minimum average prediction error for the entire block of pixels. The selected motion vector is used as previously described to classify the block.

The filter assigned to the class can have a three-dimensional shape, where its taps can span over several frames. In other words, a 3D filter contains $N_r$ pieces of a two-dimensional filter as previously described. FIG. 5C illustrates a 3D filter being used for coefficients training or pixel prediction that contains two pieces 511, 513 of a 2D filter with different 2D filter shapes. When the 3D filter is placed over multiple reference frames, each piece of its 2D filter is placed on the corresponding reference frame 515, 517, and positioned by the target pixel motion vector 519, 521 associated with that reference frame. Once the filter is placed on the reference frames, the input tap pixels are identified, which may be from different frames. The remaining training or prediction procedures are same described for the single reference frame embodiment.

Figure 5D:
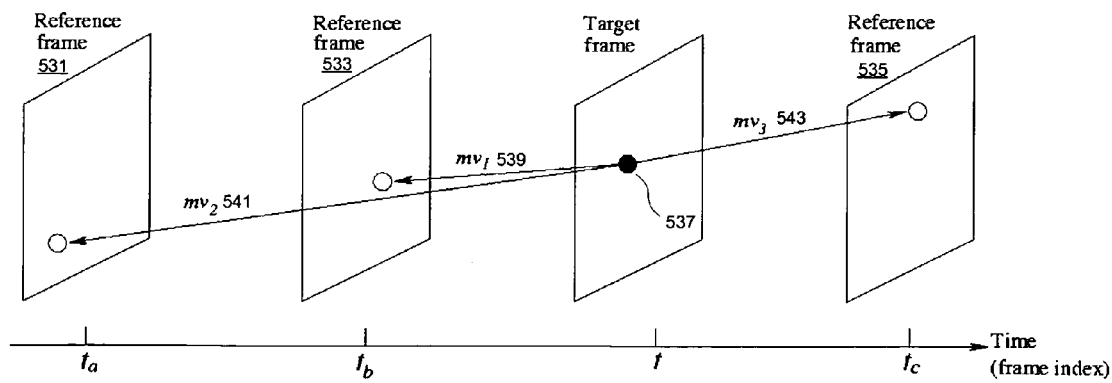
Figure 5C:
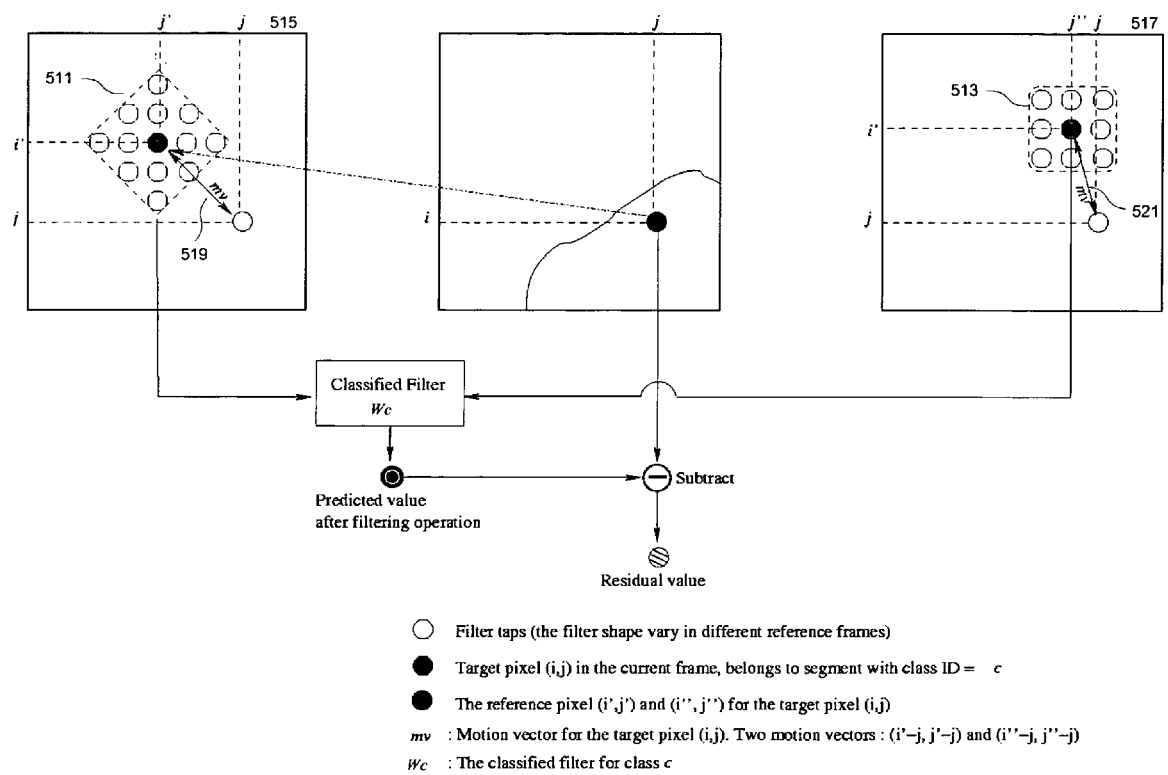

Another example of TCF with multiple reference frames is shown in FIG. 5D. In this case, there are three reference frames ($N_r=3$), two past reference frames 531, 533 and one future reference frame 535. The target pixel 537 has three motion vectors ($mv_1$ 539, $mv_2$ 541 and $mv_3$ 543), each of which identifies a reference pixel in each reference frame. Recall the 3D TCF filter can have arbitrary shape for each reference frame, FIG. 5D illustrates an extreme case in which the TCF filter only has one tap on each reference frame, with each tap aligning to the reference pixel. The filter has a total of three taps, and the target pixel can be predicted from the filtering operation on the three reference pixels.

Figure 6A:
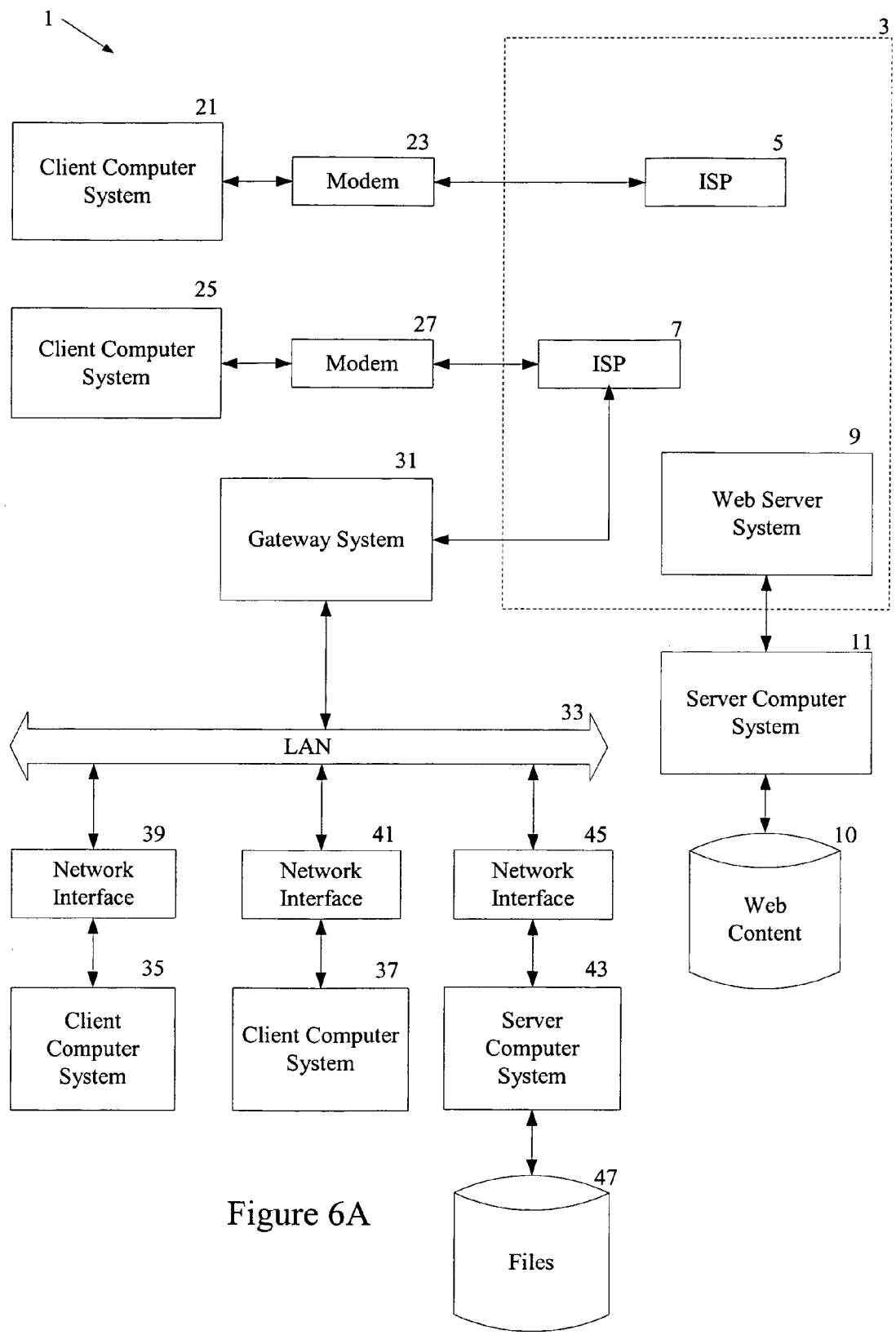
FIG. 6A is a diagram of one embodiment of an operating environment suitable for practicing the present invention.
Figure 6B:
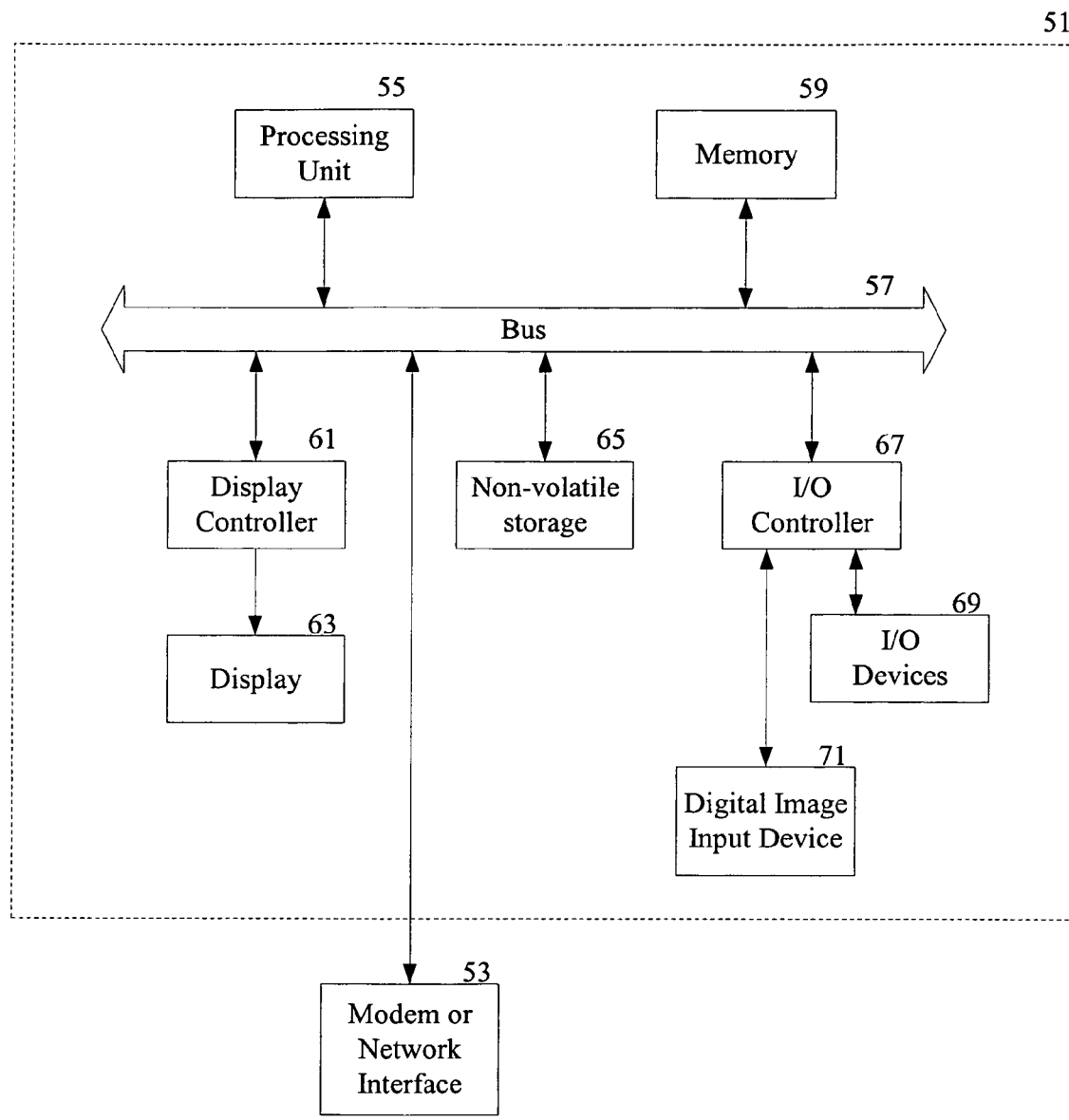
FIG. 6B is a diagram of one embodiment of a computer system suitable for use in the operating environment of FIG. 6A.

The following description of FIGS. 6A-B is intended to provide an overview of computer hardware and other operating components suitable for performing the methods of the invention described above but is not intended to limit the applicable environments. For example, the encoder 203 and/or the decoder 207 illustrated in FIG. 2 may be implemented in a general purpose computer system as described below in conjunction with FIG. 6B, or in a device particularly configured to perform the functions described herein. The communications link 205 may be a public or private connection, and the connection may be client-server or peer-to-peer as described below in conjunction with FIG. 6A. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 6A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 6A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld device, or other such computer system. Similarly, the ISP 7 provides Internet connectivity for client systems 25, 35, and 37, although as shown in FIG. 6A, the connections are not the same for these three computer systems. Client computer system 25 is coupled through a modem interface 27 while client computer systems 35 and 37 are part of a LAN. While FIG. 6A shows the interfaces 23 and 27 as generically as a "modem," it will be appreciated that each of these interfaces can be an analog modem, ISDN modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31. Furthermore, any combination of client systems 21, 25, 35, 37 may be connected together through a peer-to-peer system using LAN 33, Internet 3 or a combination as a communications medium. Generally, a peer-to-peer system distributes data across a network of multiple machines for storage and retrieval without the use of a central server or servers. Thus, each peer may incorporate the functions of both the client and the server described above.

FIG. 6B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompass a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 6B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

Temporal classified filtering has been described that predicts pixels in image data so that the pixel values can be recreated after transmission Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A computerized method to encode image data comprising:
   determining a motion vector for each block of pixels in a target frame of image data having multiple blocks, wherein each pixel is associated with a value for the motion vector of the corresponding block;
   grouping each pixel in the target frame into a plurality of groups based on the value of the associated motion vector, wherein one group of pixels contains disconnected pixels that are from different blocks having similar motion vector values;
   assigning each group of pixels to a one of a plurality of different motion classes;
   assigning a filter to each motion class, wherein coefficients of the filter are trained using pixels from the motion class to which the filter is assigned, wherein a first filter assigned to a first motion class has a first filter shape and a second filter assigned to a second motion class has a second filter shape, and wherein the first filter shape is different than the second filter shape;
   generating an initial set of coefficients for each filter using the group of pixels assigned to the motion class to which a filter is assigned;
   predicting, by a computer, values for the group of pixels assigned to each motion class using the filter assigned to the motion class and a reference frame;
   calculating prediction error values for the predicted values, wherein the filter, motion vectors and prediction error values represent the group of pixels in the encoded image data;
   identifying each pixel in each motion class having a corresponding prediction error value that exceeds a prediction error value threshold; and
   generating at least one subsequent set of coefficients for each filter using pixels in the motion class to which the filter is assigned, wherein the identified pixels are excluded from the generation of the at least one subsequent set of coefficients.

2. The computerized method of claim 1, wherein the reference frame is a previously encoded frame.

3. The computerized method of claim 1, wherein the predicting comprises:
   positioning the filter on the reference frame based on the motion vector associated with a pixel being predicted.

4. The computerized method of claim 1, wherein the predicting uses multiple reference frames.

5. The computerized method of claim 4, wherein the multiple references frames are selected from past frames, future frames and combinations of past and future frames.

6. The computerized method of claim 4, wherein the filter is a three-dimensional filter comprising a two-dimensional filter for each reference frame.

7. The computerized method of claim 1 further comprising:
   generating the motion vectors.

8. The computerized method of claim 1, wherein the assigning each group of pixels comprises:
   grouping motion vectors according to the value of each motion vector into groups of motion vectors; and
   assigning a class identifier to each motion vector group.

9. The computerized method of claim 8, wherein if the groups of motion vectors number more than a pre-determined maximum, the assigning each group of pixels further comprises:
   merging motion vector groups having a small number of motion vectors until the number of motion vector groups equals the maximum.

10. The computerized method of claim 8, wherein the assigning each group of pixels further comprises:
    merging a motion vector group having a small number of motion vectors into a neighboring motion vector group.

11. The computerized method of claim 8, wherein the assigning each group of pixels further comprises:
    merging motion vector groups having a small number of motion vectors into a special class.

12. The computerized method of claim 1 further comprising:
    generating coefficients for the filter for the class based on the motion vectors for the class in the target frame, and the reference frame.

13. The computerized method of claim 1 further comprising:
    applying each filter to the reference frame based on the motion vectors and adding the prediction error values to reconstruct the pixels of the image data.

14. A non-transitory machine-readable storage medium storing executable instructions to cause a processor to perform an image data encoding method comprising:
    determining a motion vector for each block of pixels in a target frame of image data having multiple blocks, wherein each pixel is associated with a value for the motion vector of the corresponding block;
    grouping each pixel in the target frame into a plurality of groups based on the value of the associated motion vector, wherein one group of pixels contains disconnected pixels that are from different blocks having similar motion vector values;
    assigning each group of pixels to one of a plurality of motion classes;
    assigning a filter to each motion class, wherein coefficients of the filter are trained using pixels from the motion class to which the filter is assigned, wherein a first filter assigned to a first motion class has a first filter shape and a second filter assigned to a second motion class has a second filter shape, and wherein the first filter shape is different than the second filter shape;
    generating an initial set of coefficients for each filter using the group of pixels assigned to the motion class to which a filter is assigned;
    predicting values for the group of pixels assigned to each motion class using the filter assigned to the motion class and a reference frame;

calculating prediction error values for the predicted values, wherein the filter, motion vectors and prediction error values represent the group of pixels in the encoded image data;

identifying each pixel in each motion class having a corresponding prediction error value that exceeds a prediction error value threshold; and generating at least one subsequent set of coefficients for each filter using pixels in the motion class to which the filter is assigned, wherein the identified pixels are excluded from the generation of the at least one subsequent set of coefficients.

15. The non-transitory machine-readable storage medium of claim 14, wherein the reference frame is a previously encoded frame.

16. The non-transitory machine-readable storage medium of claim 14, wherein the predicting comprises:

positioning the filter on the reference frame based on the motion vector associated with a pixel being predicted.

17. The non-transitory machine-readable storage medium of claim 14, wherein the predicting uses multiple reference frames.

18. The non-transitory machine-readable storage medium of claim 17, wherein the multiple references frames are selected from past frames, future frames and combinations of past and future frames.

19. The non-transitory machine-readable storage medium of claim 17, wherein the filter is a three-dimensional filter comprising a two-dimensional filter for each reference frame.

20. The non-transitory machine-readable storage medium of claim 14, wherein the method further comprises:

generating the motion vectors.

21. The non-transitory machine-readable storage medium of claim 14, wherein the assigning each group of pixels comprises:

grouping motion vectors according to a value of each motion vector into groups of motion vectors; and assigning a class identifier to each motion vector group.

22. The non-transitory machine-readable storage medium of claim 21, wherein if the groups of motion vectors number more than a pre-determined maximum, the assigning each group of pixels further comprises:

merging motion vector groups having a small number of motion vectors until the number of motion vector groups equals the maximum.

23. The non-transitory machine-readable storage medium of claim 21, wherein the assigning each group of pixels further comprises:

merging a motion vector group having a small number of motion vectors into a neighboring motion vector group.

24. The non-transitory machine-readable storage medium of claim 21, wherein the assigning each group of pixels further comprises:

merging motion vector groups having a small number of motion vectors into a special class.

25. The non-transitory machine-readable storage medium of claim 14, wherein the method further comprises:

generating coefficients for the filter for the class based on the motion vectors for the class in the target frame, and the reference frame.

26. The non-transitory machine-readable storage medium of claim 14, wherein the method further comprises:

applying each filter to the reference frame based on the motion vectors and adding the prediction error values to reconstruct the pixels of the image data.

27. A system comprising;

a processor coupled to a memory through a bus; and an image data encoding process executed from the memory by the processor to cause the processor to determine a motion vector for each block of pixels in a target frame of image data having multiple blocks, wherein each pixel is associated with a value for the motion vector of the corresponding block, group each pixel in the target frame into a plurality of groups based on the value of the associated motion vector, wherein one group of pixels contains disconnected pixels that are from different blocks having similar motion vector values, assign each group of pixels to one of a plurality of motion classes, assign a filter to each motion class, wherein coefficients of the filter are trained using pixels from the motion class to which the filter is assigned, wherein a first filter assigned to a first motion class has a first filter shape and a second filter assigned to a second motion class has a second filter shape, and wherein the first filter shape is different than the second filter shape, generating an initial set of coefficients for each filter using the group of pixels in the motion class to which a filter is assigned, predict values for the group of pixels assigned to each motion class using the filter assigned to the motion class and a reference frame, calculate prediction error values for the predicted values, wherein the filter, motion vectors and prediction error values represent the group of pixels in the encoded image data, identify each pixel in each motion class having a corresponding prediction error value that exceeds a prediction error value threshold, and generate at least one subsequent set of coefficients for each filter using pixels in the motion class to which the filter is assigned, wherein the identified pixels are excluded from the generation of the at least on subsequent set of coefficients.

28. The system of claim 27, wherein the reference frame is a previously encoded frame.

29. The system of claim 27, wherein the image data encoding process further causes the processor to position the filter on the reference frame based on the motion vector associated with a pixel being predicted.

30. The system of claim 27, wherein the predicting uses multiple reference frames.

31. The system of claim 30, wherein the multiple references frames are selected from past frames, future frames and combinations of past and future frames.

32. The system of claim 30, wherein the filter is a three-dimensional filter comprising a two-dimensional filter for each reference frame.

33. The system of claim 27, wherein the image data encoding process further causes the processor to generate the motion vectors.

34. The system of claim 27, wherein the image data encoding process further causes the processor to group motion vectors according to a value of each motion vector into groups of motion vectors and assigning a class identifier to each motion vector group when determining a class.

35. The system of claim 34, wherein if the groups of motion vectors number more than a pre-determined maximum, the image data encoding processor further causes the processor to merge motion vector groups having a small number of motion vectors until the number of motion vector groups equals the maximum when determining a class.

36. The system of claim 34, wherein the image data encoding process further causes the processor to merge motion vector groups having a small number of motion vectors into a neighboring motion vector groups when determining a class.

37. The system of claim 34, wherein the image data encoding process further causes the processor to merge motion vector groups having a small number of motion vectors into a special class when determining a class.

38. The system of claim 27 wherein the image data encoding process further causes the processor to generate coefficients for the filter for the class based on the motion vectors for the class in the target frame, and the reference frame.

39. The system of claim 27 wherein the image data encoding process further causes the processor to apply each filter to the reference frame based on the motion vectors and adding the prediction error values to reconstruct the pixels of the image data.

40. An apparatus to encode image data comprising:
  means for determining a motion vector for each block of pixels in a target frame of image data having multiple blocks, wherein each pixel is associated with a value for the motion vector of the corresponding block;
  means for grouping the pixels in the target frame into a plurality of groups based on the motion vectors of the pixels, wherein at least one group of pixels comprises pixels from different blocks having similar motion vectors;
  means for assigning each group of pixels to a motion class;
  means for assigning a filter to each motion class, wherein coefficients of the filter are trained using pixels from the motion class to which the filter is assigned, wherein a first filter assigned to a first motion class has a first filter shape and a second filter assigned to a second motion class has a second filter shape, and wherein the first filter shape is different than the second filter shape;
  means for generating an initial set of coefficients for each filter using the group of pixels in the motion class to which a filter is assigned;
  means for predicting values for the group of pixels assigned to each motion class using the filter assigned to the motion class and a reference frame;
  means for calculating prediction error values for the predicted values, wherein the filter, motion vectors and prediction error values represent the group of pixels in the encoded image data;
  means for identifying each pixel in each motion class having a corresponding prediction error value that exceeds a prediction error value threshold; and
  means for generating at least one subsequent set of coefficients for each filter using pixels in the motion class to which the filter is assigned, wherein the identified pixels are excluded from the generation of the at least one subsequent set of coefficients.

41. The apparatus of claim 40, wherein the means for predicting comprises:
  means for positioning the filter on the reference frame based on the motion vector associated with a pixel being predicted.

42. The apparatus of claim 40 further comprising:
  means for generating the motion vectors.

43. The apparatus of claim 40, wherein the means for assigning each group of pixels comprises:
  means for grouping motion vectors according to a value of each motion vector; and
  means for assigning a class identifier to each motion vector group.

44. The apparatus of claim 40 further comprising:
  means for generating coefficients for the filter for the class based on the motion vectors for the class in the target frame, and the reference frame.

45. The apparatus of claim 40 further comprising:
  means for applying each filter to the reference frame based on the motion vectors and adding the prediction error values to reconstruct the group of pixels of the image data.

* * * * *